United States Patent
Otani et al.

(10) Patent No.: US 11,898,017 B2
(45) Date of Patent: Feb. 13, 2024

(54) REINFORCING MATERIAL AND RESIN MOLDED ARTICLE

(71) Applicant: NIPPON SHEET GLASS COMPANY, LIMITED, Tokyo (JP)

(72) Inventors: Masanori Otani, Otsu (JP); Akiyoshi Yasuda, Otsu (JP); Shinichi Kato, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 1211 days.

(21) Appl. No.: 16/485,720

(22) PCT Filed: Feb. 14, 2018

(86) PCT No.: PCT/JP2018/005079
§ 371 (c)(1),
(2) Date: Oct. 18, 2019

(87) PCT Pub. No.: WO2018/151153
PCT Pub. Date: Aug. 23, 2018

(65) Prior Publication Data
US 2023/0159715 A1    May 25, 2023

(30) Foreign Application Priority Data
Feb. 20, 2017 (JP) .................. 2017-028995

(51) Int. Cl.
| | | |
|---|---|---|
| C08J 5/10 | (2006.01) | |
| C03C 25/326 | (2018.01) | |
| C03C 25/36 | (2006.01) | |
| C03C 25/40 | (2006.01) | |
| C08J 5/08 | (2006.01) | |
| C08K 9/04 | (2006.01) | |

(52) U.S. Cl.
CPC ............ *C08J 5/10* (2013.01); *C03C 25/326* (2013.01); *C03C 25/36* (2013.01); *C03C 25/40* (2013.01); *C08J 5/08* (2013.01); *C08K 9/04* (2013.01); *C08J 2381/02* (2013.01); *C08K 2201/014* (2013.01)

(58) Field of Classification Search
None
See application file for complete search history.

(56) References Cited

U.S. PATENT DOCUMENTS

| | | |
|---|---|---|
| 2018/0155534 A1 | 6/2018 | Kato et al. |
| 2018/0162764 A1 | 6/2018 | Kato |

FOREIGN PATENT DOCUMENTS

| | | |
|---|---|---|
| EP | 0947479 A2 | 10/1999 |
| JP | S614758 A | 1/1986 |
| JP | H11286873 A | 10/1999 |
| JP | 2001172055 A | 6/2001 |
| JP | 2002212421 A | 7/2002 |
| JP | 2004011036 A | 1/2004 |
| JP | 2011052172 A | 3/2011 |
| WO | 2017022180 A1 | 2/2017 |
| WO | 2017022181 A1 | 2/2017 |

OTHER PUBLICATIONS

Machine translation of Takanobu et al. JPH 11286873 (Year: 1999).*
Database WPI, Week 200174, Thomson Scientific, London, GB; AN 2001-641512, XP002801174, and JP2001172055A (Nippon Electric Glass Co) Jun. 26, 2001.
Nippon Electric Glass Company, Limited, Extended European Search Report for 18754714.6-1102 / 3584273 PCT/JP2018005079, dated Dec. 1, 2020, 8 pages.
Japanese Office Action dated May 3, 2021, Japanese Patent Application No. 2017-028995.

* cited by examiner

*Primary Examiner* — Robert T Butcher
(74) *Attorney, Agent, or Firm* — Cesari & McKenna, LLP

(57) ABSTRACT

A reinforcing material is disclosed that includes coated glass flakes and coated glass strands. When the total amount of a glycidyl group-including resin and aminosilane contained in the coatings of the coated glass flakes corresponds to 100% by mass, the amount of the resin is 30% to 95% by mass. When the total amount of a glycidyl group-including resin, aminosilane, and a urethane resin contained in the coatings of the coated glass strands corresponds to 100% by mass, the amount of the glycidyl group-including resin is 10% to 90% by mass, the amount of the aminosilane is 0.1% to 40% by mass, and the amount of the urethane resin is 1% to 50% by mass. Both the coated glass flakes and the coated glass strands have an ignition loss of 0.1% to 2.0% by mass measured pursuant to JIS R3420 (2013).

5 Claims, 2 Drawing Sheets

_US 11,898,017 B2_

REINFORCING MATERIAL AND RESIN MOLDED ARTICLE

TECHNICAL FIELD

The present invention relates to a reinforcing material and a resin molded article.

BACKGROUND ART

As disclosed in patent document 1, the use of glass flakes coated with polyamide as a reinforcing material of a thermoplastic resin is known in the art.

PRIOR ART LITERATURE

Patent Literature

Patent Document 1: Japanese Laid-Open Patent Publication No. 2004-011036

SUMMARY OF THE INVENTION

Problem to be Solved by the Invention

There is room for improvement in strength of a resin molded article including the coated glass flakes.

One object of the present invention is to provide a reinforcing material that increases the strength of a resin molded article in a preferred manner and the resin molded article.

Means for Solving the Problem

A reinforcing material that solves the above problem is for use with a thermoplastic resin. The reinforcing material includes coated glass flakes and coated glass strands. Each of the coated glass strands includes a plurality of glass filaments and a coating formed on the glass filaments. The glass flakes have a thickness of 0.1 to 4.0 µm. The glass flakes have an average particle diameter of 10 to 800 µm. The coatings on the glass flakes contain a glycidyl group-including resin and aminosilane. The coatings on the glass flakes contain the glycidyl group-including resin in an amount of 30% to 95% by mass when the total amount of the glycidyl group-including resin and the aminosilane corresponds to 100% by mass. The coated glass flakes have an ignition loss of 0.1% to 2.0% by mass measured pursuant to JIS R3420 (2013). The coatings on the glass filaments contain a glycidyl group-including resin, aminosilane, and a urethane resin. The coatings on the glass filaments contain the glycidyl group-including resin in an amount of 10% to 90% by mass, the aminosilane in an amount of 0.1% to 40% by mass, and the urethane resin in an amount of 1% to 50% by mass when the total amount of the glycidyl group-including resin, the aminosilane, and the urethane resin corresponds to 100% by mass. The coated glass strands have an ignition loss of 0.1% to 2.0% by mass measured pursuant to JIS R3420 (2013).

A resin molded article that solves the above problem includes a thermoplastic resin and the reinforcing material.

Preferably, in the resin molded article, the thermoplastic resin is polyphenylene sulfide.

Preferably, the resin molded article includes the coated glass flakes in an amount of 1% to 35% by mass and the coated glass strands in an amount of 5% to 70% by mass when the total amount of the thermoplastic resin, the coated glass flakes, and the coated glass strands corresponds to 100% by mass.

Effect of the Invention

The present invention succeeds in increasing the strength of a resin molded article in a preferred manner.

MODE FOR CARRYING OUT THE INVENTION

One embodiment of a reinforcing material and a resin molded article will now be described.

The reinforcing material is for use with a thermoplastic resin. The reinforcing material includes coated glass flakes and coated glass strands.

Each coated glass flake includes a glass flake and a coating formed on the surface of the glass flake. The coated glass flakes increase the strength of a resin molded article, which is obtained by mixing the reinforcing material in a thermoplastic resin. The glass flakes of the coated glass flakes may be produced through a blow molding process, which is disclosed in, for example, Japanese Examined Patent Publication Nos. 41-17148 and 45-3541, or a rotational molding process, which is disclosed in, for example, Japanese Laid-Open Patent Publication No. 59-21533 and Japanese National Phase Laid-Open Patent Publication No. 2-503669.

Figure 1:
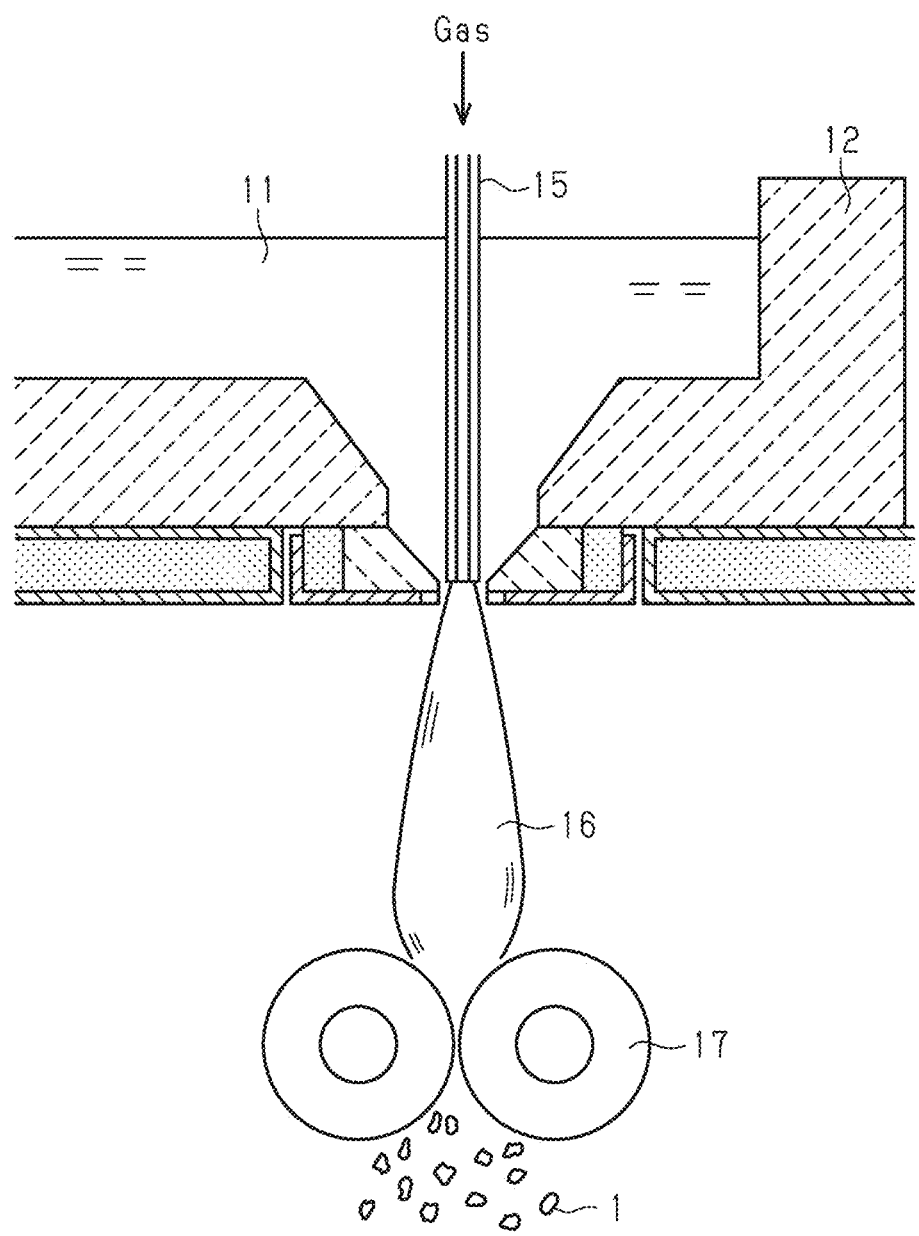
FIG. 1 is a schematic diagram of a glass flake manufacturing apparatus.

In the blow molding process, a glass flake manufacturing apparatus shown in FIG. 1 can be used. The manufacturing apparatus includes a fire-resistant furnace tank 12, a blow nozzle 15, and press rolls 17. A glass base material 11 melted in the fire-resistant furnace tank 12 (melting tank) is inflated by gas delivered to the blow nozzle 15 into a balloon-like hollow glass film 16. The press rolls 17 crush the hollow glass film 16 to obtain glass flakes 1. The thickness of the glass flakes 1 can be controlled by adjusting, for example, a tensile rate of the hollow glass film 16 or a flow rate of the gas delivered from the blow nozzle 15.

Figure 2:
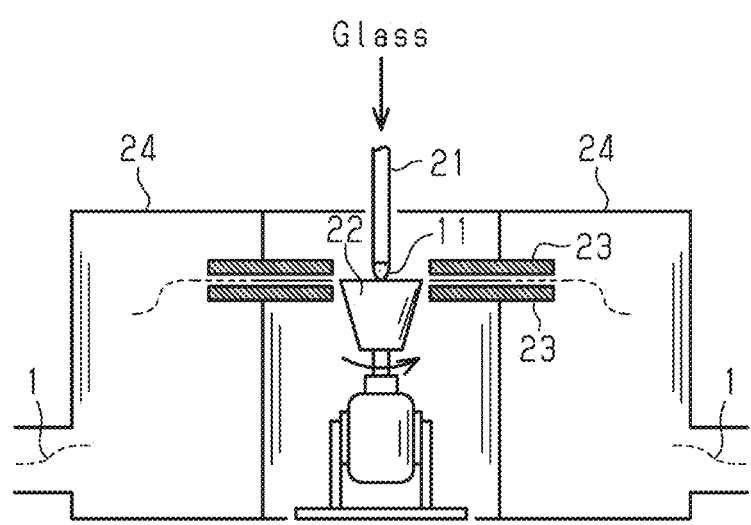
FIG. 2 is a schematic diagram of a glass flake manufacturing apparatus.

In the rotational molding process, a glass flake manufacturing apparatus shown in FIG. 2 can be used. The manufacturing apparatus includes a rotation cup 22 and a set of annular plates 23 and annular cyclone collectors 24. Molten glass base material 11 is fed through a nozzle 21 into the rotation cup 22 and radially forced out of an upper edge of the rotation cup 22 by centrifugal force. The molten glass base material 11 is drawn by an air flow through between the annular plates 23 into the annular cyclone collectors 24. When passing through the annular plates 23, the molten glass is cooled and hardened into a thin film and then crushed into microscopic pieces to obtain the glass flakes 1. The thickness of the glass flakes 1 can be controlled by adjusting, for example, the space between the annular plates 23 or the velocity of the air flow.

The composition of the glass flake can be a commonly known glass composition. Specifically, a glass with little alkali metal oxide, such as an E-glass, can be preferably used. A typical composition of the E-glass is described below.

SiO$_2$: 52% to 56% by mass
Al$_2$O$_3$: 12% to 16% by mass
CaO: 16% to 25% by mass
MgO: 0% to 6% by mass
Na$_2$O+K$_2$O: 0% to 2% by mass (preferably, 0% to 0.8% by mass)
B$_2$O$_3$: 5% to 13% by mass
F$_2$: 0% to 0.5% by mass The glass flakes have a thickness of 0.1 to 4.0 µm and an average particle diameter of 10 to 800 µm. If the glass flakes are too thick or the average particle diameter of the glass flakes is too small, it will be difficult for the resin molded article to obtain high initial strength and a hot-water resistance. The initial strength of the resin molded article is the strength of the resin molded article that has not been exposed to external effects such as light, heat, force, or chemicals.

In the present specification, the average thickness of the glass flakes refers to a value obtained by measuring the thickness of 100 or more randomly selected glass flakes with a scanning electron microscope (SEM) and dividing the total thickness by the number of the measured glass flakes. The average particle diameter of the glass flakes refers to a particle diameter (D50) corresponding to the cumulative mass percentage of 50% in a particle diameter distribution of the glass flakes measured through a laser diffraction/scattering method.

The coatings of the coated glass flakes contain a glycidyl group-including resin and aminosilane.

In the coatings of the coated glass flakes, when the total amount of the glycidyl group-including resin and aminosilane corresponds to 100% by mass, the amount of the glycidyl group-including resin is 30% to 95% by mass, preferably, 50% to 95% by mass.

In the coatings of the coated glass flakes, if the amount of the glycidyl group-including resin is too small, the resin molded article will have a low initial strength and a low hot-water resistance. In the coatings of the coated glass flakes, if the amount of the glycidyl group-including resin is too large, the initial strength of the resin molded article will be lowered, the moldability of the resin molded article will be lowered, or the productivity of the glass flakes will be lowered.

In the coatings of the coated glass flakes, when the total amount of the glycidyl group-including resin and aminosilane corresponds to 100% by mass, the amount of aminosilane is 5% to 70% by mass, preferably, 5% to 50% by mass.

In the coatings of the coated glass flakes, if the amount of aminosilane is too small or too large, the resin molded article will have a low initial strength and a low hot-water resistance.

The coated glass flakes have an ignition loss of 0.1% to 2.0% by mass measured pursuant to JIS R3420 (2013). The measurement and calculation processes of the ignition loss specified on page 12 of JIS R3420 (2013) will now be described.

A test piece holder holding a test piece is placed in a dryer at 105° C.±5° C. and dried for at least 30 minutes. Subsequent to the drying, the test piece holder holding the test piece is transferred to a desiccator and cooled under room temperature. Subsequently, the test piece with the test piece holder is measured in a unit of 0.1 mg or less. The drying, cooling, and measurement are repeated until the mass becomes constant. The dried test piece with the test piece holder is placed in a muffle furnace, which is adjusted to a temperature selected from 625° C.±20° C. or 500° C. to 600° C. The test piece with the test piece holder is heated for 10 minutes or longer with the door closed. In this case, the test piece with the test piece holder may be heated for 5 minutes with the door of the muffle furnace left open before closing the door. When the temperature is 500° C. to 600° C., the heating time is set to at least 1 hour. Then, the test piece holder holding the test piece is removed from the muffle furnace and transferred to a desiccator and cooled under a standard temperature. The test piece with the test piece holder is measured in a unit of 0.1 mg or less. The heating, cooling, and measurement are repeated until the mass becomes constant. The calculation process is expressed by the following equation, where H$_2$ represents the ignition loss [mass fraction (%)]:

$$H_2=[(m_1-m_2)/(m_1-m_0)]\times 100.$$

Here, m$_1$ is mass of the dried test piece and test piece holder (g);
m$_2$ is mass of the dried and heated test piece and test piece holder (g); and
m$_0$ is mass of the test piece holder (g).

If the ignition loss of the coated glass flakes is too low, it will be difficult for the coated glass flakes to be granular. If the ignition loss of the coated glass flakes is too high, it will be difficult for the coated glass flakes to have a high dispersibility in a thermoplastic resin. This will decrease the initial strength of the resin molded article. Further, a cracked gas is likely to be generated from the coatings of the coated glass flakes in the manufacturing process of the resin molded article. This may adversely affect the manufacturing environment or lower the moldability of the resin molded article.

Examples of the glycidyl group-including resin include, for example, a bisphenol A epoxy resin, a phenol novolac epoxy resin, an O-cresol novolac epoxy resin, and a hydrogenated bisphenol A epoxy resin. The glycidyl group-including resin may be used either alone or in combination of two or more types.

Examples of aminosilane include, for example, γ-aminopropyltriethoxysilane, N-β-(aminoethyl)-γ-aminopropyltrimethoxysilane, N-β-(animoethyl)-N'-β(aminoethyl)-γ-aminopropyltriethoxysilane, and γ-anilinopropyltrimethoxysilane. Aminosilane may be used either alone or in combination of two or more types.

The formation of the coatings on the glass flakes is performed by, for example, adding a treatment agent, which contains aminosilane, a glycidyl group-including resin, and water, to the glass flakes, and then agitating and drying the glass flakes and the treatment agent. This forms the coatings each of which covers at least part of each glass flake. The process of adding the treatment agent for the glass flakes, agitating, and drying is not specifically limited. One example of the process will now be described.

For example, a predetermined amount of a bonding agent is added by spraying or the like while the glass flakes are in motion in a mixer, such as a rotating disc mixer or a Henschel mixer including rotating blades in a mixing container. The glass flakes and the bonding agent are then mixed and agitated in the mixer. Subsequently, the glass flakes are dried during the agitation in the mixer. Alternately, the glass flakes are removed from the mixer and dried. This obtains the coated glass flakes.

In addition to the above process, the coated glass flakes can be produced by applying a known process such as an agitation granulation process, a fluidized bed granulation process, an injection granulation process, and a rotation granulation process.

The treatment agent for the glass flakes may further contain, for example, a surfactant, an antifoam agent, or an antistatic agent when necessary. The obtained coated glass flakes are granular. That is, each coated glass flake may be formed by bonding some glass flakes with the coatings on the surfaces of the glass flakes.

Each of the coated glass strands is formed by bonding a plurality of glass filaments (mono-filament) of which the surfaces are coated. That is, each coated glass strand includes a plurality of glass filaments and the coating on the glass filaments. Accordingly, in the coated glass strand, the glass filaments are bonded by the coating. In the present specification, the coatings of the coated glass strands may be referred to as "the second coatings" and distinguished from the coatings of the coated glass flakes.

The fiber diameter of the glass filament is, for example, 6 to 24 μm. The number of the glass filaments bonded to form a glass strand is, for example, several hundreds to several thousands.

The second coatings contain a glycidyl group-including resin, aminosilane, and a urethane resin.

In the second coatings, when the total amount of the glycidyl group-including resin, the aminosilane, and the urethane resin corresponds to 100% by mass, the amount of the glycidyl group-including resin is 10% to 90% by mass.

In the second coatings, if the amount of the glycidyl group-including resin is too small, the resin molded article will have a low initial strength and a low hot-water resistance. In the second coatings, if the amount of the glycidyl group-including resin is too large, the dispersibility of the coated glass strands in a thermoplastic resin will be lowered. This will decrease the initial strength of the resin molded article.

In the second coatings, when the total amount of the glycidyl group-including resin, the aminosilane, and the urethane resin corresponds to 100% by mass, the amount of aminosilane is 0.10% to 40% by mass.

In the second coatings, if the amount of aminosilane is outside the above range, the resin molded article is likely to have a low initial strength and a low hot-water resistance.

In the second coatings, when the total amount of the glycidyl group-including resin, the aminosilane, and the urethane resin corresponds to 100% by mass, the amount of the urethane resin is 1% to 50% by mass.

In the second coatings, if the amount of the urethane resin is too small, the dispersibility of the coated glass strands in a thermoplastic resin will be lowered. This will decrease the initial strength of the resin molded article. In the second coatings, if the amount of the urethane resin is too large, the initial strength and the hot-water resistance of the resin molded article will be lowered.

The coated glass strands have an ignition loss of 0.1% to 2.0% by mass measured pursuant to JIS R3420 (2013).

If the ignition loss of the coated glass strands is too low, the bondability of the coated glass strands will be lowered. If the ignition loss of the coated glass strands is too high, the dispersibility of the coated glass strands in a thermoplastic resin will be lowered. This will decrease the initial strength of the resin molded article. Further, in this case, a cracked gas is likely to be generated from the second coatings in the manufacturing processes of the resin molded article. This may adversely affect the manufacturing environment or lower the moldability of the resin molded article.

The coated glass strands can be obtained by applying a sizing agent to a plurality of glass filaments (mono-filament) drawn out of a nozzle hole in a bushing and then heating (drying) the sizing agent. The sizing agent contains a glycidyl group-including resin, aminosilane, and a urethane resin. The sizing agent may further contain a surfactant, an antifoam agent, or an antistatic agent when necessary. The coated glass strands may be cut into lengths of approximately 1 to 50 mm, that is, the coated glass strands may be chopped strands.

The resin molded article includes a thermoplastic resin and a reinforcing material. The reinforcing material includes the coated glass flakes and the coated glass strands.

Preferably, the thermoplastic resin is polyphenylene sulfide. However, other thermoplastic resins may be used.

Preferably, the resin molded article include 1% to 35% by mass of the coated glass flakes and 5% to 70% by mass of the coated glass strands when the total amount of the thermoplastic resin, the coated glass flakes, and the coated glass strands corresponds to 100% by mass.

If the amount of the coated glass flakes in the resin molded article is too small, the hot-water resistance will easily decrease. If the amount of the coated glass flakes in the resin molded article is too large, the initial strength of the resin molded article will easily decrease.

If the amount of the coated glass strands in the resin molded article is too small, the initial strength of the resin molded article will easily decrease. If the amount of the coated glass strands in the resin molded article is too large, the strength subsequent to a hot water test will easily decrease.

The resin molded article is used, for example, in an electric component, an electronic component, a precision machinery component, and an automobile component.

Next, samples will be described.

<Coated Glass Flakes>

In samples A1 to A4, glass flakes were mixed and agitated while blowing a glass flake treatment agent, containing aminosilane, a glycidyl group-including resin, and water, against the glass flakes in a Henschel mixer. Then, the glass flakes were dried to obtain coated glass flakes (E-glass), which are granular.

Table 1 shows the thickness of the glass flakes, the average particle diameter of the glass flakes, the coating composition, and the ignition loss for the coated glass flakes of samples A1 to A4.

<Coated Glass Strands>

In sample B1, predetermined amounts of various glass raw materials were weighed and prepared to form the glass composition of an E-glass. Then, the glass raw materials were melted to obtain molten glass. The obtained molten glass was drawn out of a bushing including a plurality of nozzles to obtain mono-filaments having a diameter of 10.5 µm. A sizing agent, containing a glycidyl group-including resin, aminosilane, and a urethane resin, was applied to the surfaces of the obtained mono-filaments. Four thousand mono-filaments were bundled with a bundling device into a glass strand, and the glass strand was wound around a paper pipe in a traversing manner. The glass strand were drawn out of the paper pipe and chopped into lengths of 3 mm. Then, the chopped glass strands were heated with a heating device to harden the sizing agent, which forms coatings (second coatings) on the mono-filaments. Coated glass strands were obtained in this manner.

Table 2 shows the coating composition and the ignition loss for the coated glass strands of sample B1.

<Resin Molded Article>

In sample C1, 10% by mass of the coated glass flakes of sample A1, 30% by mass of the coated glass strands of sample B1, and 60% by mass of a thermoplastic resin (polyphenylene sulfide) were kneaded and pelletized. The pellets serving as a resin material were injection-molded to obtain the resin molded article.

In samples C2 to C4, the resin molded articles were obtained in the same manner as sample C1 except in that the type of coated glass flakes were changed as illustrated in table 3.

An initial tensile strength and a tensile strength subsequent to a hot-water resistance test of each sample were measured in a manner pursuant to ASTM D638. In the hot-water resistance test, each resin molded article was immersed in hot water of 121° C. for 300 hours. Table 3 shows the initial tensile strength and the tensile strength subsequent to the hot-water resistance test of each sample.

TABLE 1

|  |  | Sample A1 | Sample A2 | Sample A3 | Sample A4 |
|---|---|---|---|---|---|
| Glass Flake | Thickness (µm) | 0.7 | 0.7 | 0.7 | 5 |
|  | Average Particle Diameter (µm) | 160 | 160 | 160 | 160 |
| Coating | Glycidyl Group-Including Resin (mass %) | 55 | 20 | 55 | 55 |
|  | Aminosilane (mass %) | 45 | 80 | 45 | 45 |
|  | Ignition Loss (mass %) | 0.6 | 0.6 | 5 | 0.6 |

TABLE 2

|  | Sample B1 |
|---|---|
| Glycidyl Group-Including Resin (mass %) | 60 |
| Aminosilane (mass %) | 10 |
| Urethane Resin (mass %) | 30 |
| Ignition Loss (mass %) | 0.6 |

TABLE 3

|  |  | Sample C1 | Sample C2 | Sample C3 | Sample C4 |
|---|---|---|---|---|---|
| Coated Glass Flake | Type | Sample A1 | Sample A2 | Sample A3 | Sample A4 |
|  | Mass % | 10 | 10 | 10 | 10 |
| Coated Glass Strand | Type | Sample B1 | Sample B1 | Sample B1 | Sample B1 |
|  | Mass % | 30 | 30 | 30 | 30 |
| Tensile Strength of Resin Molded Article (MPa) | Initial | 180 | 166 | 168 | 155 |
|  | Subsequent to Hot-Water Resistance Test | 125 | 109 | 119 | 102 |

For sample C2, in the coated glass flakes, the amount of the glycidyl group-including resin was too small and the amount of aminosilane was too large. Thus, the initial strength and the strength subsequent to the hot-water resistance test of the resin molded article of sample C2 were lower than sample C1.

For sample C3, the ignition loss of the coated glass flakes was too high. Thus, the initial strength and strength subsequent to the hot-water resistance test of the resin molded article of C3 were lower than sample C1.

For sample C4, the glass flakes of the coated glass flakes were too thick. Thus, the initial strength and strength subsequent to the hot-water resistance test of the resin molded article of C4 were lower than sample C1.

Modified Example

As illustrated in tables 4 and 5, coated glass flakes of samples A5 to A7 and coated glass strands of sample B2 were obtained. Further, as illustrated in table 6, resin molded articles of samples C5 to C10 were obtained. The initial tensile strength and the tensile strength subsequent to the hot-water resistance test of the resin molded article of each sample are illustrated in table 6.

TABLE 4

|  |  | Sample A5 | Sample A6 | Sample A7 |
|---|---|---|---|---|
| Glass Flake | Thickness (µm) | 0.7 | 1.3 | 0.7 |
|  | Average Particle Diameter (µm) | 160 | 160 | 40 |
| Coating | Glycidyl Group-Including Resin (mass %) | 55 | 55 | 55 |
|  | Aminosilane (mass %) | 45 | 45 | 45 |
|  | Ignition Loss (mass %) | 1.5 | 0.6 | 0.6 |

TABLE 5

|  | Sample B2 |
|---|---|
| Glycidyl Group-Including Resin (mass %) | 80 |
| Aminosilane (mass %) | 10 |
| Urethane Resin (mass %) | 10 |
| Ignition Loss (mass %) | 0.6 |

TABLE 6

|  |  | Sample C5 | Sample C6 | Sample C7 | Sample C8 | Sample C9 | Sample C10 |
|---|---|---|---|---|---|---|---|
| Coated Glass Flake | Type | Sample A5 | Sample A6 | Sample A7 | Sample A1 | Sample A1 | Sample A1 |
|  | Mass % | 10 | 10 | 10 | 10 | 5 | 15 |
| Coated Glass Strand | Type | Sample B1 | Sample B1 | Sample B1 | Sample B2 | Sample B1 | Sample B1 |
|  | Mass % | 30 | 30 | 30 | 30 | 35 | 25 |
| Tensile Strength of Resin Molded Article (MPa) | Initial | 179 | 177 | 178 | 182 | 187 | 175 |
|  | Subsequent to Hot-Water Resistance Test | 127 | 123 | 124 | 126 | 122 | 127 |

As illustrated in table 6, for the resin molded articles of samples C5 to C10, similar to the resin molded article of sample C1, the initial tensile strength was greater than or equal to 175 MPa, and the tensile strength subsequent to the hot-water resistance test was greater than or equal to 122 MPa.

The above described embodiment has the following advantages.

(1) A reinforcing material is for use with a thermoplastic resin. The reinforcing material includes coated glass flakes and coated glass strands. The thickness of glass flakes of the coated glass flakes is 0.1 to 4.0 µm, and the average particle diameter of the glass flakes is 10 to 800 µm. The coatings of the coated glass flakes contain the glycidyl group-including resin and aminosilane. When the total amount of the glycidyl group-including resin and the aminosilane corresponds to 100% by mass, the amount of the glycidyl group-including resin is 30% to 95% by mass. The ignition loss of the coated glass flakes measured pursuant to JIS R3420 (2013) is 0.1% to 2.0% by mass.

Each coated glass strand includes a plurality of glass filaments and the coating formed on the glass filaments. The coatings of the coated glass strands contain a a glycidyl group-including resin, aminosilane, and a urethane resin. In the coatings of the coated glass strands, when the total amount of the glycidyl group-including resin, the aminosilane, and the urethane resin corresponds to 100% by mass, the amount of the glycidyl group-including resin is 10% to 90% by mass, the amount of aminosilane is 0.1% to 40% by mass, and the amount of the urethane resin is 1% to 50% by mass. The ignition loss of the coated glass strands measured pursuant to JIS R3420 (2013) is 0.1 to 2.0% by mass.

This structure increases the strength of the resin molded article in a preferred manner. For example, this structure maintains the strength of the resin molded article when in use. Further, this structure increases the initial strength that is the strength of the resin molded article prior to use.

(2) The resin molded article includes a thermoplastic resin and the reinforcing material described in the above item (1). Preferably, the thermoplastic resin is polyphenylene sulfide. When the total amount of the thermoplastic resin, the coated glass flakes, and the coated glass strands corresponds to 100% by mass, it is preferred that the resin molded article include 1% to 35% by mass of the coated glass flakes and 5% to 70% by mass of the coated glass strands. The resin molded article having such a structure easily further increases the initial strength of the resin molded article and the strength of the resin molded article subsequent to the hot water test.

DESCRIPTION OF REFERENCE CHARACTERS 1) glass flake.

The invention claimed is:
1. A reinforcing material for use with a thermoplastic resin, the reinforcing material comprising:
   coated glass flakes; and
   coated glass strands,
   wherein each of the coated glass strands includes a plurality of glass filaments and a coating formed on the glass filaments,
   the glass flakes have a thickness of 0.1 to 4.0 µm,
   the glass flakes have an average particle diameter of 10 to 800 µm,
   the coatings on the glass flakes contain a first glycidyl group-including resin and aminosilane,
   the coatings on the glass flakes contain the first glycidyl group-including resin in an amount of 30% to 95% by mass when a total amount of the first glycidyl group-including resin and the aminosilane, corresponds to 100% by mass,
   the coated glass flakes have an ignition loss of 0.1% to 2.0% by mass measured pursuant to JIS R3420 (2013),
   the coatings on the glass filaments contain a second glycidyl group-including resin, aminosilane, and a urethane resin,
   the coatings on the glass filaments contain the second glycidyl group-including resin in an amount of 10% to 90% by mass, the aminosilane in an amount of 0.1% to 40% by mass, and the urethane resin in an amount of 1% to 50% by mass when a total amount of the second glycidyl group-including resin, the aminosilane, and the urethane resin corresponds to 100% by mass, and
   the coated glass strands have an ignition loss of 0.1% to 2.0% by mass measured pursuant to JIS R3420 (2013); and
   wherein the reinforcing material has a mass ratio of coated glass flakes to coated glass strands of 1 to 15/25 to 70.
2. A resin molded article, comprising:
   a thermoplastic resin; and
   the reinforcing material according to claim 1.
3. The resin molded article according to claim 2, wherein the thermoplastic resin is polyphenylene sulfide.
4. The resin molded article according to claim 2, wherein the resin molded article includes the coated glass flakes in an amount of 1% to 35% by mass and the coated glass strands in an amount of 5% to 70% by mass when a total amount of the thermoplastic resin, the coated glass flakes, and the coated glass strands corresponds to 100% by mass.

5. The resin molded article according to claim 3, wherein the resin molded article includes the coated glass flakes in an amount of 1% to 35% by mass and the coated glass strands in an amount of 5% to 70% by mass when a total amount of the thermoplastic resin, the coated glass flakes, and the coated glass strands corresponds to 100% by mass.

\* \* \* \* \*